(12) United States Patent
Wei et al.

(10) Patent No.: US 9,671,292 B2
(45) Date of Patent: Jun. 6, 2017

(54) ELECTRICAL COMPONENT REMOTE TEMPERATURE MONITORING SYSTEM AND METHOD

(71) Applicant: ROCKWELL AUTOMATION TECHNOLOGIES, INC., Mayfield Heights, OH (US)

(72) Inventors: Kun Wei, Shanghai (CN); Wei Qian, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 706 days.

(21) Appl. No.: 14/052,447

(22) Filed: Oct. 11, 2013

(65) Prior Publication Data

US 2015/0103862 A1 Apr. 16, 2015

(51) Int. Cl.
*G01J 5/00* (2006.01)
*G01J 5/08* (2006.01)
*G01J 5/02* (2006.01)
*G01K 11/12* (2006.01)

(52) U.S. Cl.
CPC .......... *G01J 5/0896* (2013.01); *G01J 5/0066* (2013.01); *G01J 5/0096* (2013.01); *G01J 5/025* (2013.01); *G01J 5/026* (2013.01); *G01K 11/12* (2013.01); *G01J 2005/0077* (2013.01)

(58) Field of Classification Search
None
See application file for complete search history.

(56) References Cited

U.S. PATENT DOCUMENTS

| 6,549,025 | B1* | 4/2003 | Tubera | G01K 11/12 |
| | | | | 174/252 |
| 2009/0141432 | A1 | 6/2009 | Kingston | |
| 2010/0044567 | A1* | 2/2010 | Brandt | G01J 5/0096 |
| | | | | 250/334 |
| 2012/0028559 | A1 | 2/2012 | Kingston | |
| 2012/0097413 | A1 | 4/2012 | Bugaris et al. | |
| 2012/0199542 | A1* | 8/2012 | Knight | H05K 7/20836 |
| | | | | 211/183 |

* cited by examiner

*Primary Examiner* — Erica Lin
(74) *Attorney, Agent, or Firm* — Fletcher Yoder P.C.

(57) ABSTRACT

The present techniques generally relate to a system and methods for remotely monitoring the interior of a closed electrical enclosure for localized heating (e.g., hot spots). In general, the monitoring system includes features designed to detect one or more hot spots within a dim or dark environment, determine the location of the hot spot within the enclosure, determine a temperature range of the hot spot, and/or notify (e.g., alarm or alert) an operator upon detection of the hot spot. The monitoring system may include one or more temperature sensitive elements configured to determine the heating of potential hot spots within the electrical enclosure. Further, the foregoing features may be designed to allow one or more electrical enclosures to remotely communicate with computer equipment (e.g., workstation or general purpose computers) over a wireless network.

17 Claims, 5 Drawing Sheets

ELECTRICAL COMPONENT REMOTE TEMPERATURE MONITORING SYSTEM AND METHOD

CROSS REFERENCE TO RELATED APPLICATIONS

This application claims priority to Chinese Patent Application No. 201310274715.1 entitled "Electrical Component Remote Temperature Monitoring System and Method," filed on Jul. 2, 2013, which is herein incorporated by reference.

BACKGROUND

The present invention relates generally to the field of electrical enclosures, such as enclosures for motor control centers used in industrial and commercial settings. More particularly, embodiments of the present invention relate to electrical enclosures designed with a remote temperature monitoring system.

Electrical enclosures and cabinets can be used in a wide range of industrial and automation applications. The enclosures are configured to support electrical circuitry and electrical components therein, and to receive and send electrical power and data signals. For example, the enclosures can be employed to house various power electronics equipment, control circuits, motor drives, and so forth. Within the industry, it is not uncommon to find the enclosures divided into individual segments and bays that house electrical components, such as single and three-phase switches, motor controllers, programmable automation controllers, data and power network interfaces, and so forth. Because the electrical components within the enclosure function in a high voltage environment, doors are used to control and regulate access to the interior of the individual bays or segments during operation of the enclosures.

In some situations, electrical faults within the enclosure can cause sudden pressure increases and/or localized heating (e.g., hot spots). For example, localized heating within the enclosure may damage wires, insulation, components, and even the structure of the enclosure. Moreover, localized heating within the enclosure can lead to increased costs due to lost production time and system failures. However, it is difficult to continuously (e.g., during operation) monitor a closed electrical enclosure for localized heating. For example, it is difficult to examine the dark interior of a closed electrical enclosure to determine the location of the localized heating while the system is in normal operation mode. Moreover, when a system is believed or known to be experiencing faults, considerable time may be involved in donning and doffing appropriate gear to open the enclosures for manual verification and servicing. In virtually all cases, it would be preferred to avoid such service until and unless it is actually required. Still further, techniques have been proposed for detecting arcflash events in enclosures, but these are typically extremely hot, and so can be detected directly. Heating that does not or that does not necessarily result in arcing is simply undetectable by such approaches. Accordingly, there is a need for cost-effective techniques for remotely monitoring abnormal temperatures (e.g., localized heating or hot spots) within a closed electrical enclosure in real-time.

BRIEF DESCRIPTION

The present techniques generally relate to a system and methods for remotely monitoring the interior of a closed electrical enclosure for localized heating (e.g., hot spots). In general, the monitoring system includes features designed to detect one or more hot spots within a dim or dark environment, determine the location of the hot spot within the enclosure, determine a temperature range of the hot spot, and/or notify (e.g., alarm or alert) an operator upon detection of the hot spot. For example, the monitoring system may include one or more temperature sensitive elements (e.g., paints, coatings, and/or decals) configured to determine the heating of potential hot spots within the electrical enclosure. In certain embodiments, the temperature sensitive elements may be disposed on or between the electrical components within the electrical enclosure, such that they are proximal to or disposed on the potential hot spots. In particular, the monitoring system is configured to determine the heating of the potential hot spots based upon a change in appearance of the temperature sensitive elements. Further, the monitoring system may include a light source configured to illuminate the temperature sensitive elements and/or the potential hot spots for better visibility, and a detection system configured to receive and process the reflected light as image related data.

In general, the monitoring features may be designed to remotely monitor the interior of a closed electrical enclosure for information related to localized heating. For example, the electrical enclosure may be monitored in real-time even while the doors and covers to the enclosure remain closed. Further, the foregoing features may be designed to allow one or more electrical enclosures to remotely communicate with computer equipment (e.g., workstation or general purpose computers) over a wireless network. In this manner, gathered data related to localized heating within one or more enclosures may be communicated to a remote control/monitoring system. In some situations, an operator may be alerted or notified upon detection of a localized heating within the enclosure. In certain embodiments, information related to a particular area may also be identified and communicated over a wireless network, such as, for example, a location of the localized heating within the enclosure and/or a temperature range.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
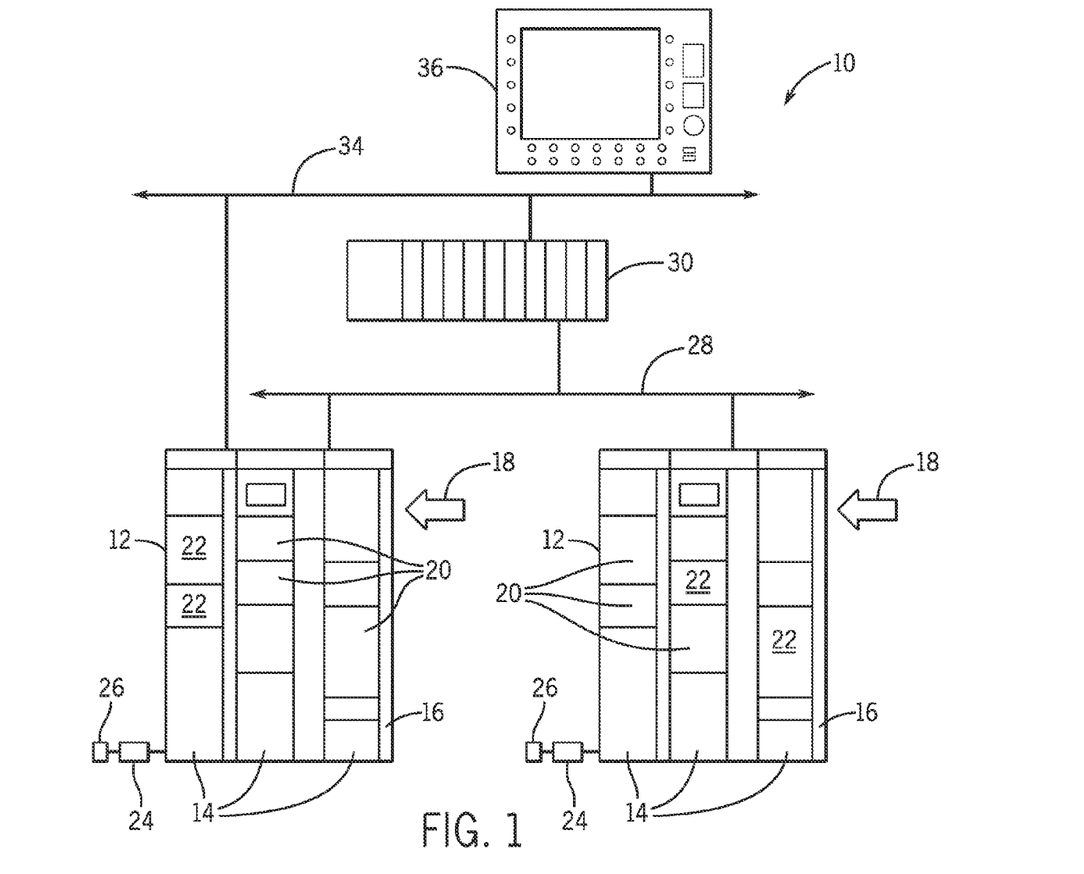
FIG. 1 is a diagrammatical representation of an automation system having exemplary electrical enclosures communicating data to a remote control/monitoring center over a wireless network in accordance with the present techniques.

FIG. 1 is illustrates an embodiment of an automation system 10 having one or more electrical enclosures. In the depicted embodiments, the electrical enclosures may be one or more motor control centers (MCC) 12 used in various industrial and automation applications. Each MCC 12 comprises a cabinet having one or more sections 14 with one or more wireways 16 running alongside the sections 14. In certain embodiments, the wireways 16 may be dedicated for data, control power, load conductors, and so forth. In a typical application, power 18 is applied to the MCC 12 via three-phase power conductors. The power 18 may be coupled to a utility grid or may be drawn from local power generation equipment. While the present techniques are described with reference to MCCs, and particular components and circuits that they typically include, it should be borne in mind that the same techniques may be equally suitable for detecting hotspots in other settings, enclosures, applications, and so forth.

Within the MCC 12, the power 18 is distributed through a series of power buses (not shown) and made available to electrical components disposed within one or more bays 20. As will be appreciated by those skilled in the art, each section 14 of the MCC 12 includes one or more bays 20. Each bay 20 is covered by a door 22 that may be locked or latched to prevent access to the interior of the bay 20 during periods when the electrical components within the enclosure are energized. Many separate bays 20 may be provided with separate doors 22, depending upon the particular components to be housed within the bays 20, their groupings and interconnection, their functionality in the application, and so forth. In certain embodiments, the power 18 may be applied to the various bays 20 by power stabs that allow the bay 20 to be plugged into AC bus bars. Depending upon the type of load and the type of control desired, the electrical components within the bays 20 will include circuit protection components, such as fuses, circuit breakers, and so forth, as well as power connection components, such as relays, contactors, and so forth. Particular control components, such as automation controllers, motor starters, motor controllers and drives, and so forth may also be housed in the bays 20 and interconnected with other components for the desired control.

In certain embodiments, power is output from the MCC 12, typically as three-phase power, and is then applied to one or more motors 24. The motor 24 will perform some desired function within the automation system 10 (e.g., automated machine or process). For example, the motor 24 may be used to operate one or more loads 26 within the automation system 10, such as electric motors of various configuration and size, valves, actuators or linear actuators, and so forth. In such processes, multiple MCCs 12 may be provided in the same or different locations and power is routed to each device in accordance with the machine or process design.

Each MCC 12 within the automation system 10 is coupled to one or more networks, which may be utilized for data communication. In certain embodiments, the MCC 12 may be coupled to an industrial data exchange network, such as DeviceNet, ControlNet, Profibus, Modbus, and so forth. In such embodiments, the MCC 12 may communicate within the MCC 12 and between the MCC 12 and other external equipment via the industrial data exchange protocols. In other embodiments, data communications between and within the MCC 12 and external equipment may take place via EtherNet and/or Internet protocols. As illustrated in FIG. 1, in such embodiments, a control network 28 is coupled to the MCC 12 via a gateway/linking device 30. The gateway/linking device 30 functions to bridge one network to another, such as, for example, bridging the control network 28 with an EtherNet/IP network 34. In such embodiments, the gateway/linking device 30 gathers information from the control network 28 and transfers it to the EtherNet/IP network 34 for programming, configuration, control, data collection, and so forth. In other embodiments, the EtherNet/IP network 34 may enable direct data communications between one or more MCCs 12 and the remote control/monitoring system 36, without the need for the gateway/linking device 30. In this manner, the networks 28 and 34 allow the MCC 12 to communicate with a remote control/monitoring system 36.

The remote control/monitoring system 36 includes remote control and monitoring circuitry configured to control and monitor various operations of the MCC 12 and the automation system 10. For example, the remote control/monitoring system 36 includes automation controllers, control and monitoring coordinating equipment, plant or production line control equipment, and so forth. In particular, the remote control/monitoring system 36 may be configured to remotely monitor the interior of the MCC 12 for localized heating. In certain embodiments, the remote control/monitoring system 36 communicates over the networks 28 and 34 with a detection system (depicted in FIG. 2) disposed within the MCC 12. For example, the detection system is configured to receive and process information related to localized heating within the MCC 12, and communicates the information to the remote control/monitoring system 36.

For example, the remote control/monitoring system 36 may receive processed information from the detection system relating to a detected hot spot within the MCC 12. In such situations, in response to the received processed information, the remote control/monitoring system may alert or notify an operator about the location and/or temperature range of the detected hot spot within the MCC 12. In other embodiments, the detection system may receive raw information relating to potential hot spots within the MCC 12 and may communicate the raw information to the remote control/monitoring system 36. In these situations, the remote control/monitoring system 36 may process and analyze the raw information to determine the location and/or the temperature range of a hot spot within the MCC 12. The remote control/monitoring system may alert or notify an operator regarding the detected information. The remote control/monitoring system 36 may be configured to alert or notify the operator about the hot spot within the MCC 12 visually (e.g., text and/or graphics on a display, a flashing light, or a combination thereof), audibly (e.g., audible sound or warning through a speaker system), or a combination thereof.

Figure 2:
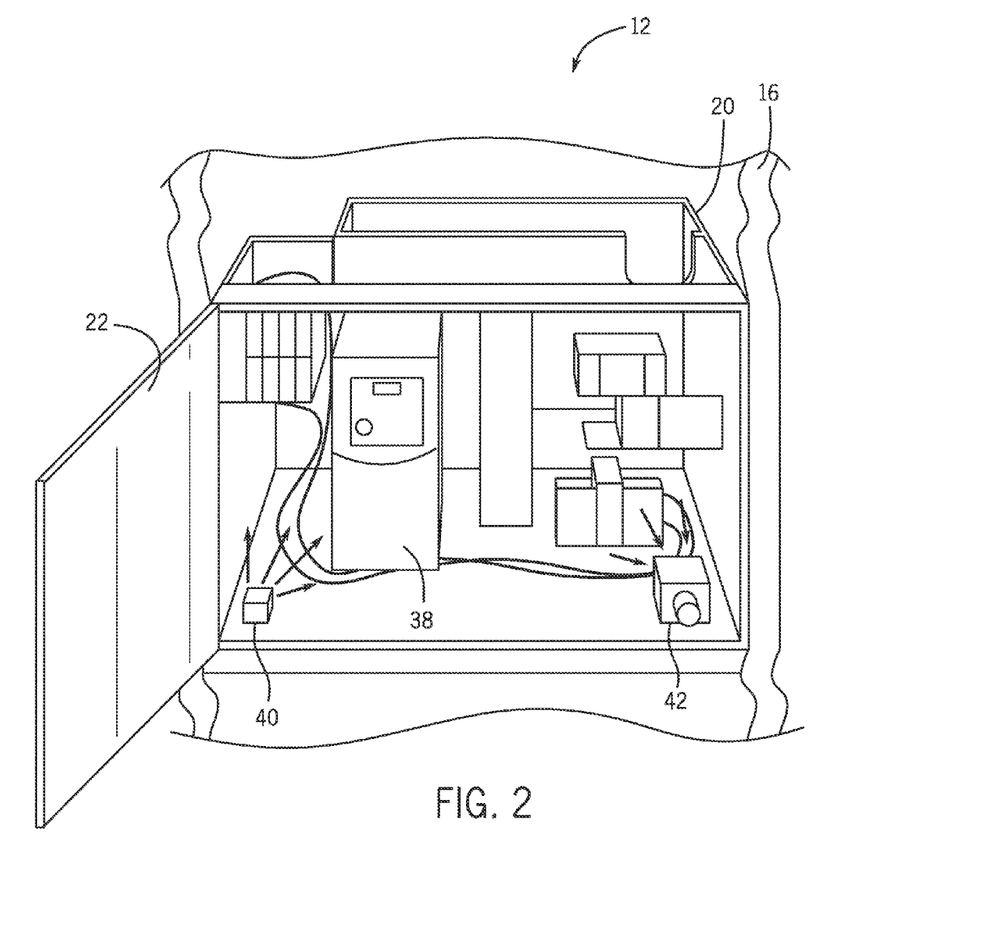
FIG. 2 is a partial diagrammatical representation of the interior of a portion of the electrical enclosure of FIG. 1 in accordance with the present techniques.

FIG. 2 illustrates a detailed view of the interior of a portion of the electrical enclosure of FIG. 1. More specifically, FIG. 2 illustrates the interior of a single bay 20 within the MCC 12, such that the door 22 to the bay 20 is in the open position. As illustrated, the wireways 16 run alongside the bay 20, and may be dedicated for data, control power, load conductors, and so forth. Each bay 20 of the MCC 12 include one or more electrical components 38 (e.g., components 38), such as relays, motor starters, circuit breakers, variable frequency drives, automation controllers, programmable logic controllers (PLCs), or the like, that provide functionality for controlling a system or process. Each of the components 38 may also include one or more stabs housings (not shown) that isolate electrical connectors, such as metal power stabs that engage vertical bus bars (not shown) disposed within the rear of the MCC 12. In particular, components of temperature monitoring system, such as one or more temperature sensitive elements (depicted in FIG. 3), a light source 40, and a detection/monitoring system 42 (e.g., detection system 42), may be disposed within the bay 20.

In certain embodiments, the light source 40 may be one or more infrared light emitting diodes (LEDs) disposed within the bay 20. The light source 40 is adapted to produce light, such as infrared light, to illuminate a plurality of surfaces on the components 38 and/or on the one or more temperature sensitive elements disposed within the bay 20. In particular, the light source 40 is configured to illuminate the components 38 and/or the temperature sensitive elements while the door to the bay 20 is in the closed position, where the interior of the bay 20 would otherwise be dim and dark. In certain embodiments, the light source 40 may be positioned and/or angled such that the produced light is guided from light source 40 to the surfaces of interest. The surfaces of interest may be any region or portion of the bay 20 that is susceptible to heating, such as, for example, on or between the components 38 and/or portions of the bay 20 where the temperature sensitive elements are disposed. The detection system 42 is configured to detect and receive the light reflected from the plurality of surfaces within the bay 20. As further described in FIG. 3, light produced by the light source 40 illuminates the surfaces of the components 38 and/or the temperature sensitive elements, and the light reflected from these surfaces is gathered by the detection system 42.

In the illustrated embodiment, the light source 40 and the detection system 42 are disposed as separate components within the bay 20. In other embodiments, the light source 40 may be integrated into the detection system 42. In such embodiments, the light source 40 may receive power to operate from the detection system 42. Further, control circuitry disposed within the detection system 42 may be used to control and regulate the functions of the light source 40, such as, for example, engaging the light source 40 "on" or "off," controlling the number and/or the location of the activated light source 40, controlling the intensity of the light source 40, and so forth.

Figure 3:
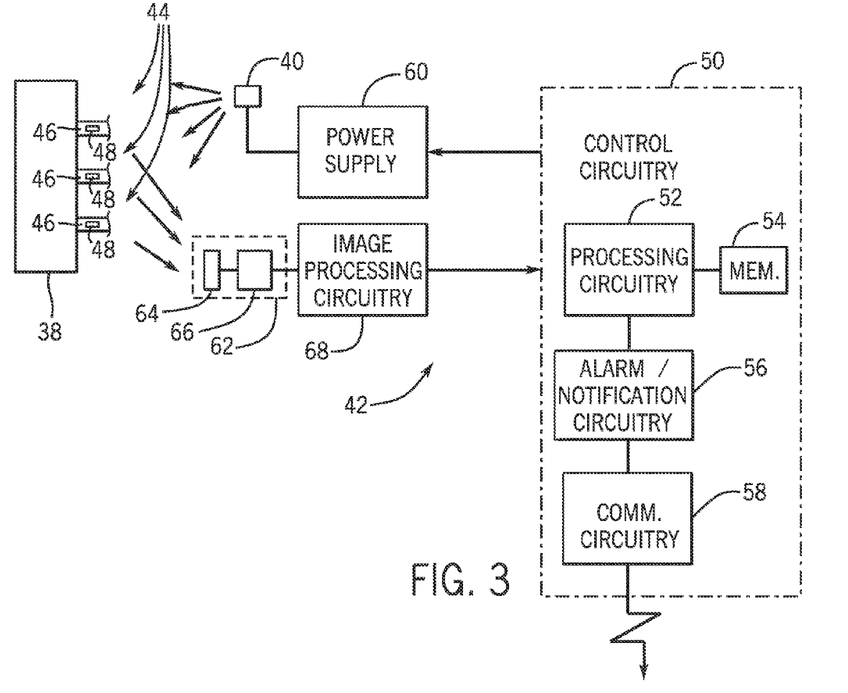
FIG. 3 is a diagrammatical representation of the interaction between the detection/monitoring system and the one or more electrical components disposed within the electrical enclosure of FIG. 1, in accordance with the present techniques.

FIG. 3 illustrates the interaction between the detection system 42 and the electrical components 38 disposed within the bay 20 of the MCC 12 of FIG. 1. As illustrated in FIG. 3, regions of the bay 20 within the MCC 12 may be susceptible to heating, and may also be known as potential hot spots within the electrical enclosure. For example, these potential hot spots 44 may be one or more regions located proximal to one or more conductors 46 coupled to the components 38. In the illustrated embodiment, one or more temperature sensitive elements 48 may be disposed on the conductors 46 to detect heating in the potential hot spot 44.

In certain embodiments, the temperature sensitive elements 48 may be any type of material capable of providing a visual indication of a change in temperature. These types of materials may include luminescent molecules, agents, or additives that are sensitive to their thermal environment. For example, a rise in temperature within the thermal environment might change the color of the temperature sensitive material once the temperature of the thermal environment crosses a threshold. As such, the thermal environment may be monitored by monitoring the appearance of the temperature sensitive elements 48. In certain embodiments, the temperature sensitive elements 48 may be a temperature sensitive paint or coating that is applied proximal to the potential hot spots 44. For example, the temperature sensitive paint or coating may be applied on or between the components of the MCC 12. In other embodiments, the temperature sensitive elements 48 may be a decal or sticker affixed on or between the components of the MCC 12 with an adhesive.

A light source 40 is configured to illuminate the surfaces of the temperature sensitive elements 48, the potential hot spots 44, and/or the components 38. A power supply 60 (e.g., batteries, wireways 16, external wall outlet, etc.) may be used to power the light source 40. In certain embodiments, control circuitry 50 within the detection system 42 includes processing circuitry 52, a memory 54, alarm/notification circuitry 56, and communication circuitry 58. As described in detail below, the control circuitry 50 is configured to control and regulate the functions of the detection system 42, such as, for example, illuminating and detecting light, processing detected light, generating an image from detected light, and processing/analyzing the image to determine heating within the bay 20. Further, in certain embodiments, the alarm/notification circuitry 56 is used to notify an operator of the heating within the MCC 12. In addition, the communication circuitry 58 may be used to communicate information related to the heating with an operator or with the remote control/monitoring system 36, in accordance with techniques described in FIG. 1.

In a dim or dark environment, such as within the interior of the closed bay 20, there is little visible light. As such, most of the light reflected by the temperature sensitive elements 48, the potential hot spots 44, and/or the components 38 is infrared light initially provided by the light source 40. The reflected light is detected by the detection system 42. In certain embodiments, the detection system 42 includes a camera 62 having a filter 64 and an imaging device 66. The imaging device 66 of the detection system 42 may include one or more image sensors configured to generate a digital image based on the detected light. For example, the image sensor may be a charge-coupled device (CCD) or a complementary metal-oxide semiconductor (CMOS) sensor. In such sensors, each pixel of the digital image is generated by converting the detected light into an electric charge. Image processing circuitry 68 may be coupled to the camera 62 to read the accumulated charge and generate the digital image. The CCD and/or the CMOS image sensors are cost effective techniques for monitoring the interior of the closed bay 20. As illustrated, the imaging device 66 of the detection system 42 receives and processes the reflected light to generate an image of the temperature sensitive elements 48 disposed proximal or on top of the one or more potential hot spots 44.

The imaging device 66 of the camera 62 may or may not be coupled to the filter 64. The filter 64 may be incorporated into the detection system 42 to block certain wavelengths of visible light from reaching the imaging device 66, while allowing infrared light to pass through. For example, the filter 64 may be an infrared pass filter with an 850 nm cut-off wavelength for visible light. As a further example, the filter 64 may be an infrared pass filter with a visible light cut-off wavelength of 630 nm, 665 nm, 715 nm, 780 nm, 830 nm, or 1000 nm.

In certain embodiments, the image processing circuitry 68 is communicatively coupled to the control circuitry 50. In particular, the images generated by the image processing circuitry 68 may be transmitted to the processing circuitry 52 for additional processing and analyzing. For example, the processing circuitry 52 may receive a color image of the temperature sensitive elements 48, where most of the visible light has already been filtered out. The processing circuitry 52 may convert the received color image to a black and white or a grayscale image for further processing and analyzing.

Figure 4:
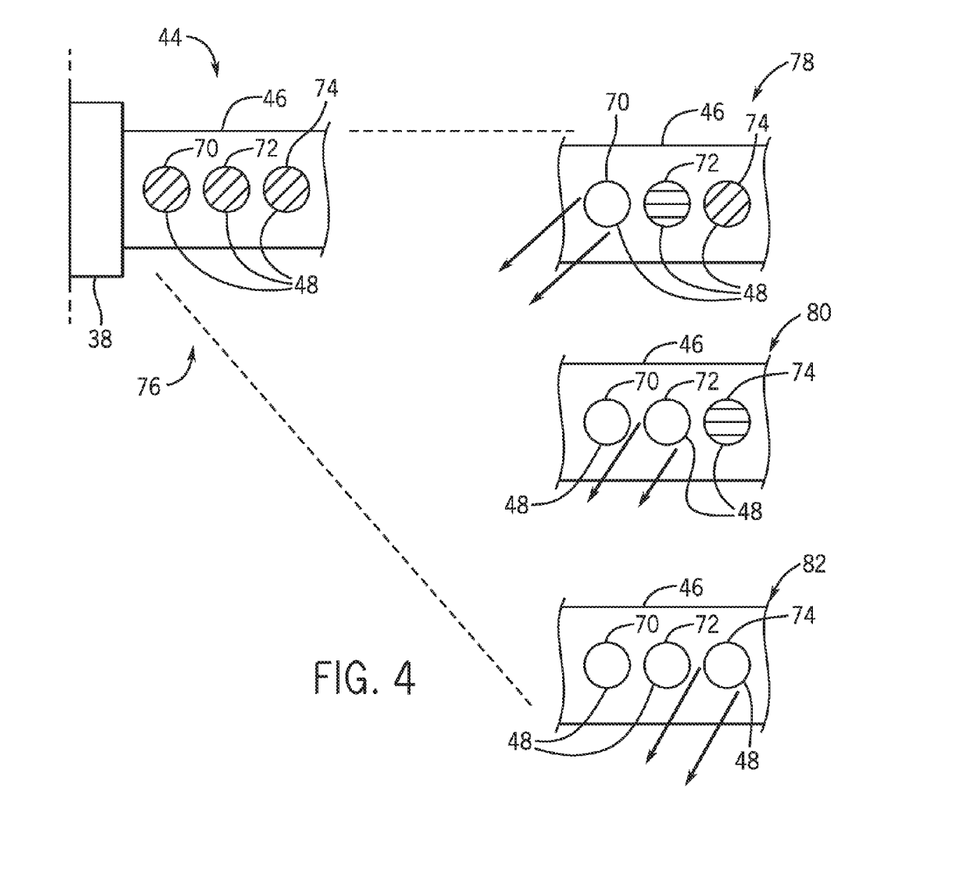
FIG. 4 is a diagrammatical representation of the temperature sensitive decals disposed on the electrical components of FIG. 3, in accordance with the present techniques.
Figures 5, 6:
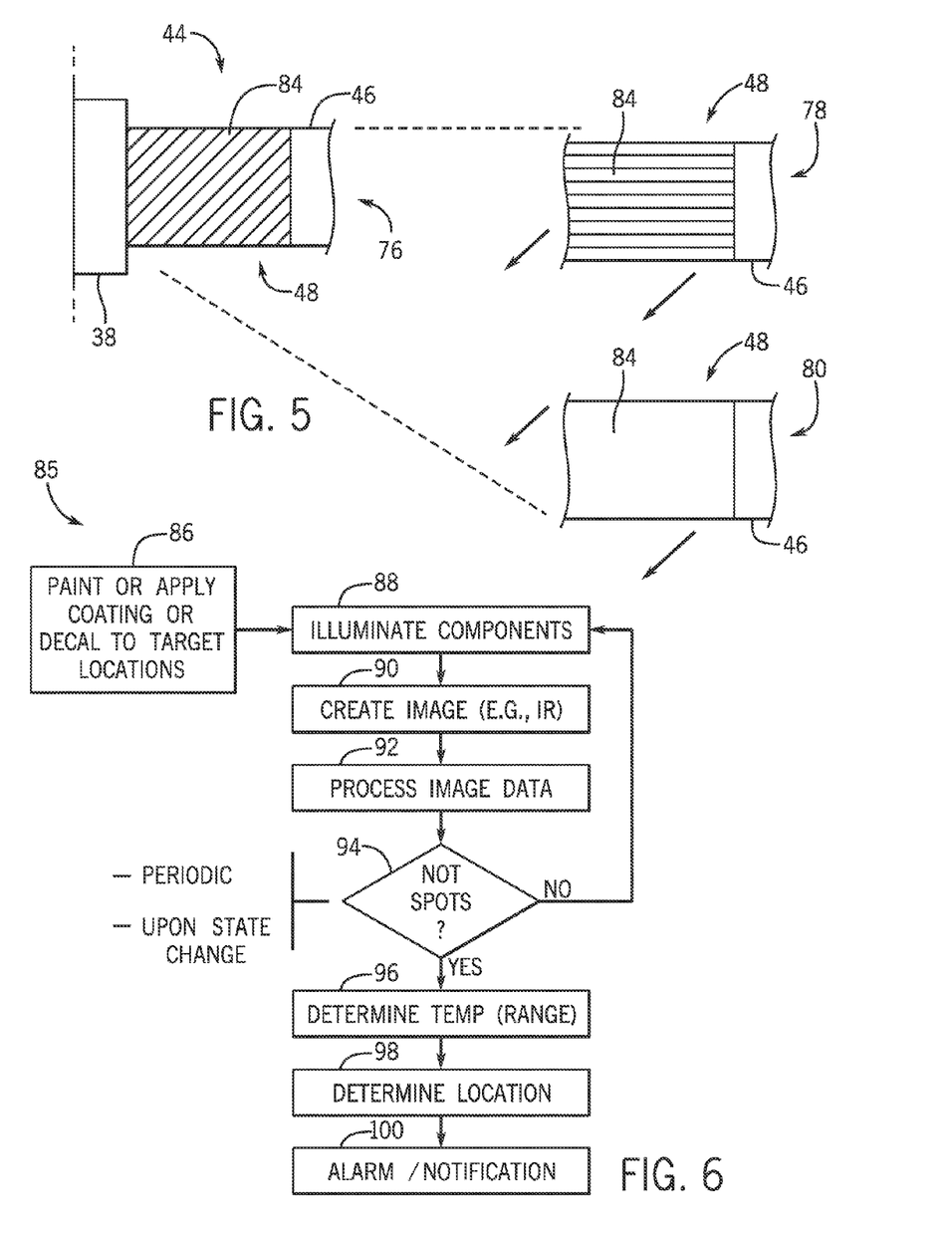
FIG. 5 is a diagrammatical representation of the temperature sensitive coating disposed on the electrical components of FIG. 3, in accordance with the present techniques.
FIG. 6 is a flow chart of a method for determining heating within the electrical enclosure of FIG. 1, in accordance with the present techniques.

In particular, and as further discussed in FIG. 6, the control circuitry 50 comprises a data processing code or algorithm that is stored in the system and executed by the processing circuitry 52. The data processing algorithm may be used to analyze the grayscale image of the temperature sensitive elements 48 and to monitor the interior of the bay 20 based on the determined information. For example, the data processing algorithm may be used to determine heating within the bay 20 by analyzing the grayscale image of the temperature sensitive element 48. The grayscale image may be analyzed for the various objects (e.g., spots) within the image, where the presence of an object within the image is indicative of a change in color of the temperature sensitive element 48. The processing circuitry 52 is also associated with the memory 54, which may be used to store historical information related to previously analyzed and processed grayscale images received. As such, in certain embodiments, the change in appearance of the temperature sensitive elements 48 may be determined by comparing the grayscale image with a previously analyzed and processed grayscale image retrieved from the memory 54. In other embodiments, the processing circuitry 52 is configured to determine a location and/or a temperature (e.g., temperature range) of the heating within the MCC 12. For example, the location of the heating within the MCC 12 may be determined by identifying the location of the camera 62 from which the grayscale image is derived from. Further, as described below with respect to FIGS. 4-5, the temperature and/or the temperature range at the location of the heating (i.e., potential hot spot 44) may be determined by analyzing the change in appearance of the temperature sensitive elements 48.

FIG. 4 is a diagrammatical representation of the temperature sensitive elements 48 disposed on the electrical components 38 of FIG. 3. In the illustrated embodiment, the temperature sensitive elements 48 are a first temperature sensitive decal 70, a second temperature sensitive decal 72, and a third temperature sensitive decal 74. The decals 70, 72, and 74 may be affixed to a region on the components 38 susceptible to heating (e.g., conductor 46), such as the potential hot spot 44. In other embodiments, the temperature sensitive elements 48 may be disposed between the components 38, directly adjacent to the potential hot spots 44, or may be generally disposed at any location within the MCC 12 susceptible to heating. In particular, changes in the thermal environment surrounding the conductor 46 or within the potential hot spot 44 may change the appearance (e.g., color) of the decals 70, 72, and 74. For example, when the temperature of the thermal environment crosses a particular temperature threshold, one or more of the decals 70, 72, or 74 may change color. This change in appearance is illuminated by the light source 40 and detected by the detection system 42.

As illustrated, one or more temperature sensitive elements 48, each with a different temperature threshold, may be used in combination with each other to provide greater flexibility in monitoring the temperature of the interior of the closed bay 20. For example, at an initial state 76 where there are no elevated temperatures within the bay 20, the decals 70, 72, or 74 may be in their natural or original color (e.g., white, red, blue, yellow, etc.). At the initial state 76, the temperatures may be within normal operating conditions for the MCC 12, such as between approximately 20° C. and 55° C., 30° C. and 50° C., or 40° C. and 45° C.

Temperatures within the interior of the closed bay 20 may increase due to various major or minor system failures. As temperatures in the surrounding environment increase from the initial state 76, the decals 70, 72, or 74 change appearances (e.g., color) when the surrounding temperature crosses the temperature threshold for each of the decals 70, 72, or 74. For example, the temperature threshold for the decal 70 may be between approximately 60° C. and 70° C., the temperature threshold for the decal 72 may be between approximately 100° C. and 110° C., and the temperature threshold for the decal 74 may be between approximately 140° C. and 150° C. As such, at a first increased temperature state 78, where the temperature of the surrounding environment is greater than 60° C. but less than 95° C., the decal 70 changes color to indicate a rise in the surrounding temperature past the temperature threshold for the decal 70. The change in appearance of the decal 70 is captured by the detection system 42, and information related to the location and/or the temperature range of the temperature increase is communicated from the control circuitry 50 to the remote control/monitoring system 36. In addition, as illustrated in the first temperature state 78, as the temperature of the thermal environment approaches the temperature threshold for the decal 72, the decal 72 begins the process of changing appearance.

Likewise, at a second increased temperature state 80, where the temperature of the surrounding thermal environment is greater than 100° C. but less than 140° C., the decal 72 changes color to indicate a rise in the surrounding temperature past the temperature threshold for the decal 72. The change in appearance of the decal 72 is captured by the detection system 42, and information related to the location and/or the temperature range of the temperature increase is communicated from the control circuitry 50 to the remote control/monitoring system 36. In addition, as the temperature of the thermal environment nears the temperature threshold for the decal 74, the decal 74 begins the process of changing appearance. As such, at a third increased temperature state 82, where the temperature of the surrounding thermal environment is greater than 140° C., all the decals 70, 72, and 74 have changed color to indicate that the surrounding thermal environment has exceeded the thermal threshold of even the decal 74. The change in appearance of the decal 74 is captured by the detection system 42, and information related to the location and/or the temperature range of the temperature increase is communicated from the control circuitry 50 to the remote control/monitoring system 36. In certain embodiments, an operator is notified or alerted when the temperature of potential hot spots 44 exceeds certain thresholds, and these thresholds may be determined through user input into the remote control/monitoring system 36.

While the illustrated embodiment has indicated various temperature thresholds for each of the decals 70, 72 and 74, the temperature sensitive elements 48 may be customized with any temperature threshold to suit the needs of the MCC 12 and the bay 20. Indeed, any number of temperature sensitive elements 48 may be used, and each temperature sensitive element 48 may be set for a different temperature threshold. As such, the present techniques provide an increased flexibility in monitoring the various temperature changes within the MCC 12. Moreover, in other embodiments, the temperature sensitive element 48 may be composed of a material configured to gradually change appearance based on the increase in temperature of the surrounding thermal environment. In such embodiments, the temperature of the surrounding environment may be based on the color of the element 48.

FIG. 5 is a diagrammatical representation of the temperature sensitive element 48 disposed on the electrical components 38 of FIG. 3, where the temperature sensitive element 48 is a temperature sensitive coating 84 (e.g., the coating 84) disposed on the conductor 46. Indeed, the coating 84 may layered to a region on the components 38 susceptible to heating (e.g., conductor 46), such as the potential hot spot 44. In other embodiments, the coating 84 may be layered between the components 38, directly adjacent to the potential hot spots 44, or may be generally disposed at any location within the MCC 12 susceptible to heating. In particular, one or more layers of coating 84 may be applied within the bay 20 of the MCC 12, where each additional layer may enhance the visibility of the coating 84 when it changes appearance.

In the illustrated embodiment, the coating 84 may have a temperature threshold of between approximately 100° C. and 110° C. As described above in FIG. 4, at an initial state 76 where there are no elevated temperatures within the bay 20, the coating 84 may be in its natural or original color. The temperatures may be within normal operating conditions for the MCC 12 at the initial state 76, such as between approximately 30° C. and 50° C. In certain embodiments, as temperatures in the thermal environment increase from the initial state 76, the coating 84 changes appearances (e.g., color) when a threshold temperature for the coating 84 is crossed. For example, at the first increased temperature state 78, where the temperature of the surrounding environment is greater than 60° C. but less than 95° C., the appearance of the coating 84 may gradually begin to change as the temperature of the surrounding environment gradually begins the process of changing appearances. As such, at the second increased temperature state 80, where the temperature of the surrounding thermal environment is greater than 100° C. but less than 140° C., the coating 84 changes color to indicate that the temperature threshold for the coating 84 has been passed. The change in appearance of the decal 74 is captured by the detection system 42, and information related to the location and/or the temperature range of the temperature increase is communicated from the control circuitry 50 to the remote control/monitoring system 36.

In other embodiments, the temperature sensitive coating 84 may be composed of a material configured to gradually change appearance based on the increase in temperature of the surrounding thermal environment. In these embodiments, the coating 84 gradually transitions from color to color as the temperatures rise from the initial state 76, to the first increased temperature state 78, and to the second increased temperature state 80, such that the color of the coating 84 within each state is different.

FIG. 6 is a flow chart of a method 85 for determining heating within the MCC 12. The method 85 may begin by painting or applying the coating 84 and/or the decals 70, 72, and 74 to target locations within the MCC 12 (block 86). As described above, the target locations may be any region with the bay 20 of the MCC 12 that is susceptible to heating, such as regions of potential hot spots 44 surrounding the conductors 46 of the electrical components 38. Indeed, the target locations may be regions between the components 38, regions directly adjacent to the components 38, or regions directly on top of the components 38.

The control circuitry 50 may then engage the light source 40 to illuminate the components 38 disposed within the bay 20 (block 88). In certain embodiments, the light source 40 may additionally illuminate the temperature sensitive elements 48 (e.g., the coating 84 or the decals 70, 72, and 74) positioned proximal to the components 38. The light source 40 may be one or more infrared light emitting diodes (LEDs) that emit infrared light. The detection system 42 is configured to detect and receive the light reflected from the plurality of surfaces within the bay 20. In particular, the detection system 42 includes image processing circuitry 68 that generates a digital image based on the detected infrared light (block 90). In certain embodiments, the image processing circuitry 68 is communicatively coupled to the control circuitry 50. In particular, the images generated by the image processing circuitry 68 may be transmitted to the processing circuitry 52 for additional processing and analyzing.

The processing circuitry 52 may use a data processing algorithm to analyze the images generated by the detection system 42. In particular, after converting the digital image to a grayscale image, the grayscale image is then analyzed to obtain additional information (block 92). For example, the image may be processed to determine the presence of various objects, shapes, or spots, which may be indicative of a change in color of the temperature sensitive elements 48 within the bay 20. This type of analysis may be done periodically or upon a certain change in state. For periodic analysis, the detection system 42 checks the status of the temperature sensitive elements 48 at predetermined intervals for a change in appearance. For analysis done upon a certain change in state, the detection system 42 continuously monitors the status of the temperature sensitive elements 48 for a change in appearance. In the absence of various objects, shapes, or spots within the grayscale image, the control circuitry 50 continues to illuminate the components 38.

The presence of various objects, shapes, or spots within the grayscale digital image may be indicative of a change in appearance of the temperature sensitive elements 48, and as such, indicative of heating within the MCC 12 at the potential hot spot 44. In such situations, the processing circuitry 52 may determine the temperature or the temperature range of the temperature sensitive elements 48 (block 96). By determining which of the temperature sensitive elements 48 have changed color and the temperature threshold for each of those elements 48, the processing circuitry 52 may determine an approximate temperature of the thermal environment within the bay 20. Further, the processing circuitry 52 may determine the location within the bay 20 of heating (block 98). For example, the processing circuitry 52 may determine the location of the camera 62 within the MCC 12 which took the initial image. In certain embodiments, the alarm/notification circuitry 56 is used to notify an operator of the heating within the MCC 12 (block 100). For example, the communication circuitry 58 within the detection system 42 may be used to communicate information related to the heating with an operator or with the remote control/monitoring system 36.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
    applying one or more temperature sensitive elements on or between one or more electrical components disposed within an electrical enclosure, wherein the one or more temperature sensitive elements are configured to change appearance based on a heating of potential hot spots within the electrical enclosure;

illuminating the temperature sensitive elements with a light source disposed within the electrical enclosure;

detecting light reflected by the temperature sensitive elements within the electrical enclosure via a camera of a detection system disposed within the enclosure;

processing the detected light, via image processing circuitry of the detection system, to generate image related information; and determining the heating of at least one hot spot within the electrical enclosure based on the generated image related information.

2. The method of claim 1, comprising determining a location of the heating of the at least one hot spot within the electrical enclosure.

3. The method of claim 1, comprising determining a temperature or a temperature range of the heating of the at least one hot spot within the electrical enclosure.

4. The method of claim 1, comprising providing an alarm indication of the heating of the at least one hot spot within the electrical enclosure.

5. The method of claim 1, wherein the heating of the at least one hot spot is determined periodically at one or more pre-set increments.

6. The method of claim 1, wherein determining the heating of the at least one hot spot occurs in response to the change in appearance of the one or more temperature sensitive elements.

7. The method of claim 1, wherein the temperature sensitive elements comprise one or more paints, coatings, or decals.

8. The method of claim 1, comprising applying a temperature sensitive paint, a temperature sensitive coating, or a temperature sensitive decal to the temperature sensitive element.

9. The method of claim 1, wherein detecting light reflected by the temperature sensitive elements with the camera of the detection system comprising detecting the light without opening the electrical enclosure.

10. The method of claim 1, wherein illuminating the temperature sensitive elements with a light source disposed within the electrical enclosure comprises illuminating the temperature sensitive elements with an infrared LED.

11. A method, comprising:

applying one or more temperature sensitive elements on or between one or more electrical components disposed within an electrical enclosure, wherein the one or more temperature sensitive elements are configured to change appearance based on a heating of potential hot spots within the electrical enclosure;

illuminating the temperature sensitive elements with a light source disposed within the electrical enclosure;

detecting light reflected by the temperature sensitive elements with a camera disposed within the enclosure, wherein the light is detected without opening the electrical enclosure and during the heating of the hot spots within the electrical enclosure;

processing the detected light, via image processing circuitry, to generate image related information; and determining the heating of at least one hot spot within the electrical enclosure based on the generated image related information.

12. The method of claim 11, comprising providing an alarm indication of the heating of the at least one hot spot within the electrical enclosure.

13. The method of claim 11, wherein illuminating the temperature sensitive elements with a light source disposed within the electrical enclosure comprises illuminating the temperature sensitive elements without opening the electrical enclosure.

14. The method of claim 11, comprising applying a temperature sensitive paint, a temperature sensitive coating, or a temperature sensitive decal to the temperature sensitive element.

15. The method of claim 11, wherein processing the detected light comprises filtering the detected light, via the image processing circuitry, to generate the image related information.

16. The method of claim 11, comprising determining a location of the heating of the at least one hot spot within the electrical enclosure.

17. The method of claim 11, comprising determining a temperature or a temperature range of the heating of the at least one hot spot within the electrical enclosure.

* * * * *